US010292105B2

United States Patent
Chhabra et al.

(10) Patent No.: US 10,292,105 B2
(45) Date of Patent: May 14, 2019

(54) MOTION-BASED ADAPTIVE SCANNING

(71) Applicant: Apple Inc., Cupertino, CA (US)

(72) Inventors: Kapil Chhabra, Milpitas, CA (US);
Tito Thomas, San Jose, CA (US);
Vinesh Pallen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 13/854,813

(22) Filed: Apr. 1, 2013

(65) Prior Publication Data

US 2014/0105086 A1   Apr. 17, 2014

Related U.S. Application Data

(60) Provisional application No. 61/714,619, filed on Oct. 16, 2012.

(51) Int. Cl.
*H04W 52/02* (2009.01)
*H04W 48/16* (2009.01)

(52) U.S. Cl.
CPC ....... *H04W 52/0251* (2013.01); *H04W 48/16* (2013.01); *H04W 52/0254* (2013.01); *Y02D 70/1242* (2018.01); *Y02D 70/1262* (2018.01); *Y02D 70/142* (2018.01); *Y02D 70/144* (2018.01)

(58) Field of Classification Search
CPC .................................................. H04W 52/02
USPC ...... 370/252, 311; 455/404.02, 414.2, 456.1, 455/456.3; 709/223
See application file for complete search history.

(56) References Cited

U.S. PATENT DOCUMENTS

| 7,904,064 | B2* | 3/2011 | Frank et al. ............... 455/414.2 |
| 8,180,486 | B2* | 5/2012 | Saito et al. .................. 700/245 |
| 8,521,681 | B2* | 8/2013 | Ouchi et al. .................... 706/62 |
| 8,536,975 | B2* | 9/2013 | Yaguchi ........................ 340/4.3 |
| 2006/0119508 | A1 | 6/2006 | Miller |
| 2006/0187873 | A1* | 8/2006 | Friday .................. H04W 48/20 370/328 |
| 2008/0086236 | A1* | 4/2008 | Saito et al. ................... 700/245 |
| 2008/0182564 | A1* | 7/2008 | Frank et al. ............... 455/414.2 |
| 2008/0186196 | A1* | 8/2008 | Lessing ............... G06Q 10/109 340/686.6 |

(Continued)

FOREIGN PATENT DOCUMENTS

GB      2305825      4/1997

*Primary Examiner* — Edan Orgad
*Assistant Examiner* — Emmanuel K Maglo
(74) *Attorney, Agent, or Firm* — Sterne, Kessler, Goldstein & Fox, PLLC

(57) ABSTRACT

In order to facilitate reduced power consumption of an electronic device (such as a smartphone) when communicating with another electronic device (such as an access point) in a wireless network, the electronic device may change a frequency of network scans performed by an interface circuit in the electronic device based on a motion profile of the electronic device. In particular, the electronic device may determine the motion profile based on spatial information, such as: acceleration data, orientation data, Global Positioning System data and/or data from the wireless network. Then, the electronic device may change the frequency of the network scans performed by the interface circuit based on the motion profile. In this way, the frequency of the network scans can be reduced when the electronic device is stationary or moving rapidly (such as when a user of the electronic device is driving in a car).

14 Claims, 4 Drawing Sheets

(56) References Cited

U.S. PATENT DOCUMENTS

| | | | |
|---|---|---|---|
| 2008/0189032 A1* | 8/2008 | Beadman | 701/208 |
| 2009/0055091 A1* | 2/2009 | Hines | G01C 21/30 |
| | | | 701/408 |
| 2009/0164813 A1 | 6/2009 | Tu et al. | |
| 2010/0217588 A1* | 8/2010 | Ouchi et al. | 704/231 |
| 2010/0273504 A1* | 10/2010 | Bull | G01S 5/02 |
| | | | 455/456.1 |
| 2010/0286490 A1* | 11/2010 | Koverzin | 600/301 |
| 2010/0302055 A1* | 12/2010 | Yaguchi | 340/825.25 |
| 2011/0100107 A1* | 5/2011 | Nobis | G01B 11/2755 |
| | | | 73/117.03 |
| 2011/0172909 A1* | 7/2011 | Kahn et al. | 701/202 |
| 2011/0173229 A1* | 7/2011 | Choudhury | G06F 17/30241 |
| | | | 707/770 |
| 2011/0211511 A1* | 9/2011 | Bakthavathsalu | |
| | | | H04W 52/0254 |
| | | | 370/311 |
| 2011/0294520 A1* | 12/2011 | Zhou | H04W 48/04 |
| | | | 455/456.1 |
| 2012/0100867 A1* | 4/2012 | Liang et al. | 455/456.1 |
| 2012/0122452 A1 | 5/2012 | Brisebois | |
| 2012/0254464 A1* | 10/2012 | Armstrong | H04L 45/24 |
| | | | 709/238 |
| 2012/0316963 A1* | 12/2012 | Moshfeghi | G06Q 20/20 |
| | | | 705/14.58 |
| 2013/0030931 A1* | 1/2013 | Moshfeghi | G01S 19/48 |
| | | | 705/16 |
| 2013/0060400 A1* | 3/2013 | Hahne | G08G 1/161 |
| | | | 701/1 |
| 2013/0084856 A1* | 4/2013 | Prasad | H04W 36/0088 |
| | | | 455/434 |
| 2013/0090106 A1* | 4/2013 | Mathews | H04W 4/00 |
| | | | 455/418 |
| 2013/0178241 A1* | 7/2013 | Duggirala | H04W 4/003 |
| | | | 455/550.1 |
| 2013/0238700 A1* | 9/2013 | Papakipos | G06F 21/81 |
| | | | 709/204 |
| 2013/0331118 A1* | 12/2013 | Chhabra | H04W 48/16 |
| | | | 455/456.1 |

* cited by examiner

MOTION-BASED ADAPTIVE SCANNING

CROSS REFERENCE TO RELATED APPLICATION

This application claims priority under 35 U.S.C. § 119(e) to U.S. Provisional Application Ser. No. 61/714,619, entitled "Motion-Based Adaptive Scanning," by Kapil Chhabra, Tito Thomas and Vinesh Pallen, filed on Oct. 16, 2012, the contents of which is herein incorporated by reference.

BACKGROUND

Field

The described embodiments relate to techniques for reducing the power consumption of electronic device in a wireless network by changing a scanning frequency based on a motion profile of the electronic device.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface.

During operation, the networking subsystem in an electronic device may periodically perform scans to discover available access points and to determine if any access point is on a preferred list of wireless networks of a user of the electronic device. If a preferred access point is discovered, the electronic device may join the wireless network.

However, this approach may result in unnecessary scans when the electronic device is stationary (for example, when it is on the nightstand) or unnecessary scans and attempts to join a wireless network at a fixed location (such as a coffeehouse) when the user is moving (for example, when the user is driving). These unnecessary scans significantly increase the power consumption of the electronic device, which reduces the overall standby time. In addition, joining a wireless network only to disconnect a few seconds later can frustrate users and degrade the user experience.

SUMMARY

The described embodiments include an electronic device. This electronic device includes: an antenna; an interface circuit, coupled to the antenna, that communicates with another electronic device using a connection in a wireless network; a processor coupled to the interface circuit; and memory that stores a program module that is executed by the processor. The program module facilitates changing a frequency of network scans performed by the interface circuit (such as connectivity scans or geo-fencing scans). In particular, the program module may determine a motion profile of the electronic device based on spatial information about the electronic device. Then, the program module may change the frequency of the network scans performed by the interface circuit based on the motion profile.

Note that the motion profile may indicate a speed of the electronic device. For example, the motion profile may include: speed less than a first threshold (such as when the electronic device is stationary); speed between the first threshold and a second threshold (such as when a user of the electronic device is walking); speed greater than the second threshold (such as when the user of the electronic device is driving); and/or other (such as unknown).

Moreover, the electronic device may include an accelerometer, and the spatial information may include acceleration measurements performed by the accelerometer. Alternatively or additionally, the electronic device may include a gyroscope, and the spatial information may include orientation measurements performed by the gyroscope. In some embodiments, the spatial information includes data from a Global Positioning System and/or the wireless network.

Another embodiment provides a computer-program product for use with the electronic device. This computer-program product includes instructions for at least some of the operations performed by the electronic device.

Another embodiment provides a method for changing the wake policy, which includes at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to facilitate reduced power consumption of an electronic device (such as a smartphone) when communicating with another electronic device (such as an access point) in a wireless network, the electronic device may change a frequency of network scans performed by an interface circuit in the electronic device based on a motion profile of the electronic device. In particular, the electronic device may determine the motion profile based on spatial information, such as: acceleration data, orientation data, Global Positioning System data and/or data from the wireless network. Then, the electronic device may change the frequency of the network scans performed by the interface circuit based on the motion profile. In this way, the frequency of the network scans can be reduced when the electronic device is stationary or moving rapidly (such as when a user of the electronic device is driving in a car).

Note that the communication with the other electronic device may be via packets that are transmitted and received by radios in the electronic devices in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface. In the discussion that follows, IEEE 802.11 (such as Wi-Fi) is used as an illustrative example. Thus, the network scans may include connectivity or discovery scans and location-based geo-fencing scans. Note that in a connectivity scan the intent may be to discover an available access points for the purpose of connecting to it. In a geo-fencing scan, a user may set location-based reminders where an electronic device alerts the user on entry/exit in a fence (for example, the electronic device may remind the user to call their spouse when they reach work). In this case, the electronic device may monitor or scan for the presence of access points that are other than access points that the electronic device can connect to for data transfer (such as access points around a location for which the electronic device does not have credentials to connect with), which the electronic device can use as an indicator of the proximity of the electronic device to a location. For example, Wi-Fi access points at or around a work place may be used to detect proximity of the electronic device to the work place. In particular, the lattidue and longitude or a location (in this case, the work place) may be mapped to a list of basic service set identifications (BSSIDs) available at the location, and the electronic device may monitor these BSSIDs by scanning periodically.

Figure 1:
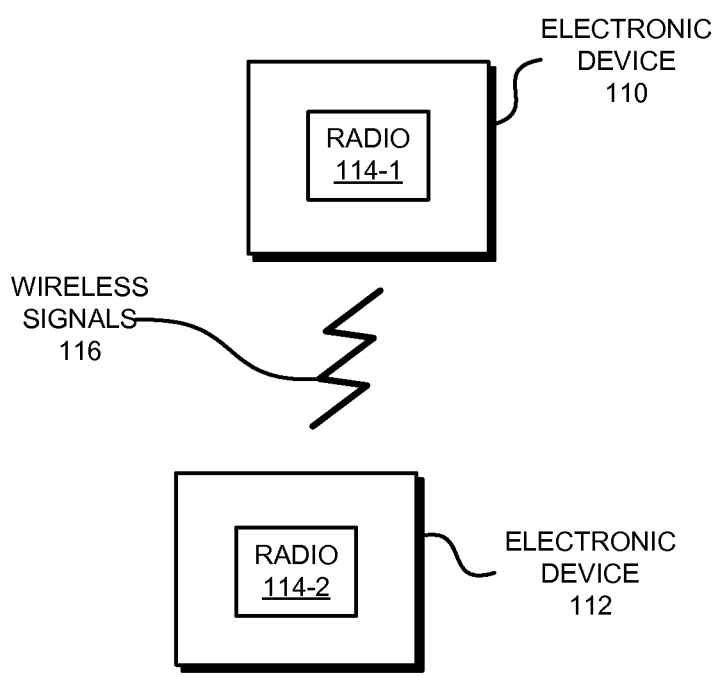
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 and 112 wirelessly communicating. In particular, these electronic devices may wirelessly communicate while: discovering one another by scanning wireless channels, transmitting and receiving advertising frames on wireless channels, establishing connections (for example, by transmitting connect requests), and/or transmitting and receiving packets.

Figure 4:
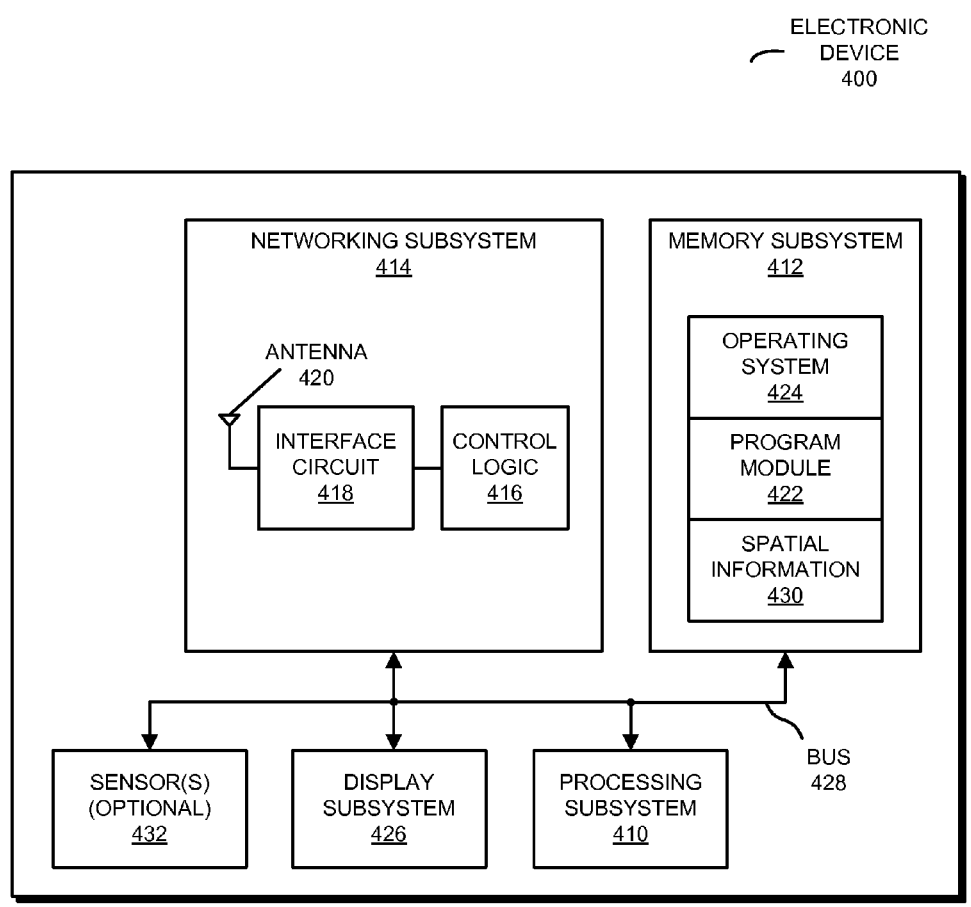
FIG. 4 is a block diagram illustrating one of the electronic devices of FIG. 1 in accordance with an embodiment of the present disclosure.

As described further below with reference to FIG. 4, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with the networking subsystems that enable electronic devices 110 and 112 to wirelessly communicate with another electronic device. This can comprise transmitting advertising frames on wireless channels to enable electronic devices to make initial contact, followed by exchanging subsequent data/management frames (such as connect requests) to establish a connection, configure security options (e.g., IPSEC), transmit and receive packets or frames via the connection, etc.

As can be seen in FIG. 1, wireless signals 116 (represented by jagged lines) are transmitted from a radio 114-1 in electronic device 110. These wireless signals 116 are received by radio 114-2 in electronic device 112.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine information contained in the packet or frame (such as synchronization information in the payload).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
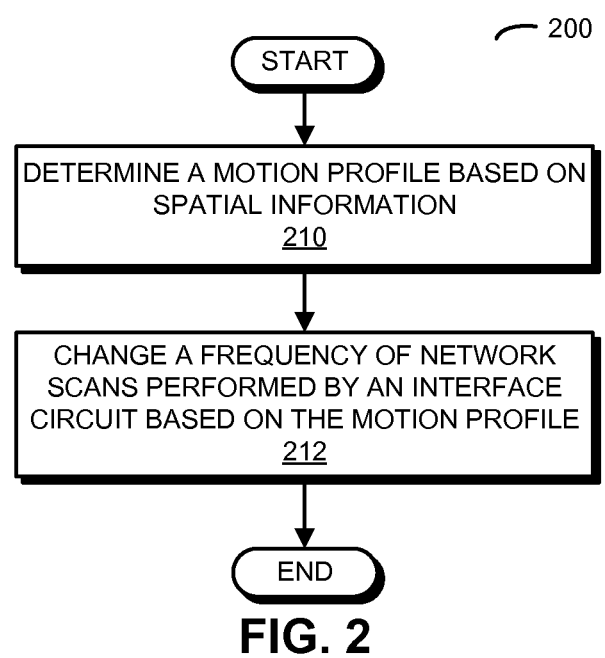
FIG. 2 is a flow diagram illustrating a method for changing a frequency of network scans performed by one of the electronic devices in FIG. 1 in accordance with an embodiment of the present disclosure.

FIG. 2 presents a flow diagram illustrating a method 200 for changing a frequency of network scans performed by one of the electronic devices in FIG. 1, such as electronic device 110. During operation, the electronic device determines a motion profile of the electronic device based on spatial information about the electronic device (operation 210). Then, the electronic device changes the frequency of the network scans performed by an interface circuit in the electronic device based on the motion profile (operation 212).

Note that the motion profile may indicate a speed of the electronic device. For example, the motion profile may include: speed less than a first threshold (such as when the electronic device is stationary); speed between the first threshold and a second threshold (such as when a user of the electronic device is walking); speed greater than the second threshold (such as when the user of the electronic device is driving); and/or other (such as unknown).

Moreover, the electronic device may include an accelerometer, and the spatial information may include acceleration measurements performed by the accelerometer. Alternatively or additionally, the electronic device may include a gyroscope, and the spatial information may include orientation measurements performed by the gyroscope. In some embodiments, the spatial information includes data from a Global Positioning System and/or the wireless network. For example, one or more of the acceleration measurements, the orientation measurements, the data from the Global Positioning System, and/or the data from the wireless network (such as a distance from an access point) may be used to determine the motion profile. In particular, a program module that implements a supervised learning technique, and which is executed by a low-power processor in the electronic device, may determine the motion profile based on the spatial information.

Furthermore, the network scans may include connectivity or discovery scans (which may be followed by connect requests) and/or location-based geo-fencing scans, such as those performed with a proximate access point.

In this way, the electronic devices (for example, program modules in the electronic devices) may facilitate reduced power consumption by ensuring that the network scans are performed as often as they need to be based on the motion profiles of the electronic devices.

In some embodiments of methods 200, there may be additional or fewer operations. Moreover, the order of the operations may be changed, and/or two or more operations may be combined into a single operation.

In an exemplary embodiment, the communication technique allows a portable electronic device (i.e., a wireless client) to perform network scans with one or more access points as needed based on the motion profile of the portable electronic device. For example, if the portable electronic device is stationary (such as when the speed is less than a first threshold of 0.5 km/hr), the frequencies of all types of network scans (such as connectivity scans and geo-fencing scans) performed by the portable electronic device may be reduced from every 45 s to every 10-20 minutes. Similarly, if the portable electronic device is in a moving car (such as when the second threshold is 5 km/hr), the network scan may be performed once when the user starts driving (so the portable electronic device can discover and connect to an access point in the vehicle), and then every 20-30 minutes. The corresponding frequency of the network scans may help prevent the Wi-Fi interface circuit in the portable electronic device from discovering and attempting to connect with stationary access points. However, when driving, the frequency of geo-fencing scans may be increased in certain circumstances, such as when a user wants to be reminded to buy an item (e.g., milk) when they drive past a supermarket.

In this case, instead of performing network scans every 45 s, the electronic device may perform the scans more frequently (e.g., 10 s) because it is possible that the user may drive in and out of the geo-fence around the supermarket within 45 s (and, thus, otherwise may not receive a reminder).

Figure 3:
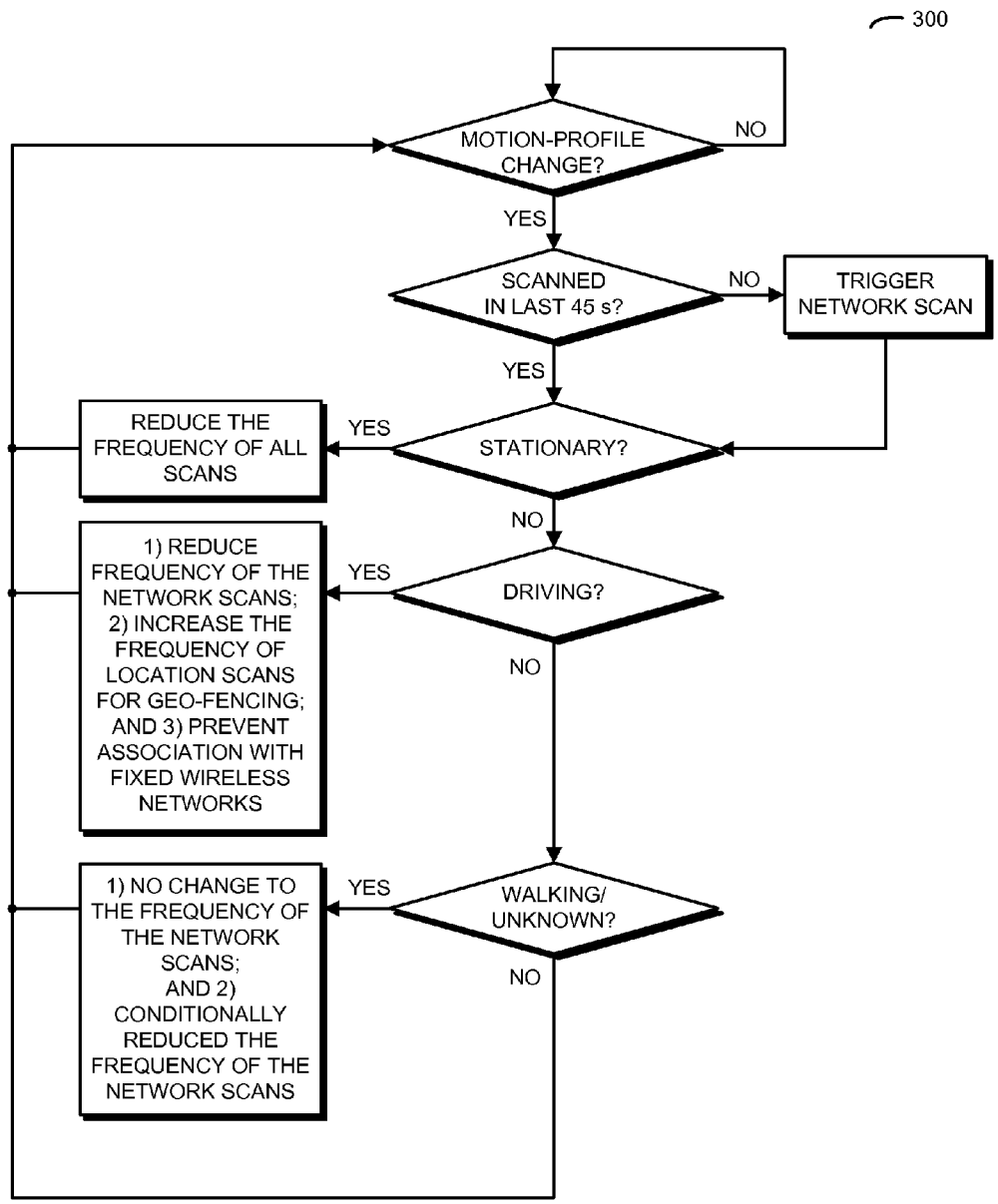
FIG. 3 is a flow diagram illustrating the method of FIG. 2 in accordance with an embodiment of the present disclosure.

FIG. 3 presents a flow diagram illustrating an exemplary embodiment of method 200 (FIG. 2). Note that in this exemplary embodiment, if the motion profile indicates 'walking' or 'unknown,' the frequency of the network scans may be conditionally reduced. In particular, BSSIDs may be monitored during discovery scans. If one or more BSSIDs are discovered with less than 20 dBm received-signal-strength-indication (RSSI) change, an exponential back-off technique may be used to reduce the frequency of the network scans.

Note that, while a user is driving, the communication technique may prevent attempts to join fixed (non-mobile) Wi-Fi wireless networks based on information learned from prior connections. For example, a Wi-Fi connection Manager may join a Wi-Fi wireless network and determine if the connection can be maintained when the motion profile indicates 'driving.' If the portable electronic device can successfully maintain the connection, the wireless network may be classified as a mobile hotspot. However, if the portable electronic device drops this connection because of low RSSI and/or missing beacons from the access point, then the wireless network may be assumed to be a fixed/non-mobile Wi-fi wireless network and attempts to join to these fixed wireless networks may be subsequently blocked while the motion profile indicates 'driving.'

In this way, portable electronic device can dynamically change how often it performs network scans and the policies associated with Wi-Fi joins to reduce power consumption and improve the user experience.

We now describe embodiments of the electronic device. FIG. 4 presents a block diagram illustrating an electronic device 400, such as one of electronic devices 110 and 112 in FIG. 1. This electronic device includes processing subsystem 410, memory subsystem 412, and networking subsystem 414. Processing subsystem 410 includes one or more devices configured to perform computational operations. For example, processing subsystem 410 can include one or more microprocessors, application-specific integrated circuits (ASICs), microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program module 422), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and an antenna 420. For example, networking subsystem 414 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between the electronic devices, e.g., transmitting advertising frames and/or scanning for advertising frames transmitted by other electronic devices as described previously.

Moreover, program module 422 may determine a current motion profile of electronic device 400 based on spatial information 430. This spatial information may be measured by one or more optional sensors 432, such as an accelerometer or a gyroscope. Based on the current motion profile, program module 422 may change a frequency of network scans performed by networking subsystem 414 (and, in particular, by interface circuit 418).

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections between the subsystems.

In some embodiments, the electronic device includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): a desktop computer, a laptop computer, a server, a media player (such as an MP5 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 400, in alternative embodiments, different components and/or subsystems may be present in electronic device 400. For example, electronic device 400 may include one or more additional processing subsystems 410, memory subsystems 412, networking subsystems 414, and/or display subsystems 426. Additionally, one or more of the subsystems may not be present in electronic device 400. Moreover, in some embodiments, electronic device 400 may include one or more additional subsystems that are not shown in FIG. 4. For example, electronic device 400 can include, but is not limited to, a data collection subsystem, an audio and/or video subsystem, an alarm subsystem, a media processing subsystem, and/or an input/output (I/O) subsystem. Also, although separate subsystems are shown in FIG. 4, in some embodiments, some or all of a given subsystem or component can be integrated into one or more of the other subsystems or component(s) in electronic device 400. For example, in some embodiments program module 422 is included in operating system 424.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414, such as a radio. Moreover, the integrated circuit may include hardware and/or software mechanisms that are used for transmitting wireless signals from electronic device 400 (FIG. 4) and receiving signals at electronic device 400 from other electronic devices (FIG. 4). Aside from the mechanisms herein described, radios are generally known in the art and hence are not described in detail. In general, networking subsystem 414 (FIG. 4) and/or the integrated circuit can include any number of radios. Note that the radios in multiple-radio embodiments function in a similar way to the described single-radio embodiments.

In some embodiments, networking subsystem 414 (FIG. 4) and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with the IEEE 802.11 standard was used as an illustrative example, the described embodiments of the communication techniques may be used in a variety of network interfaces.

Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, program module 422 can be implemented in a link layer or in firmware in a wireless client (such as electronic device 110 in FIG. 1). Alternatively or additionally, at least a portion of the communication technique may be implemented in a physical layer in the wireless client.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with a wireless network; and
a processor coupled to the interface circuit, the processor configured to:
determine a motion profile of the electronic device based at least in part on a speed of the electronic device, wherein the motion profile is determined from a plurality of preset motion profiles;
detect a Wi-Fi access point identifier during a scan, wherein the Wi-Fi access point identifier is mapped to a location associated with a reminder; and
adjust a frequency of network scans performed by the interface circuit based at least in part on the motion profile and the detection of the Wi-Fi access point identifier,
wherein the network scans comprise a connectivity scan and a location scan, and
wherein to adjust the frequency of the network scans the processor is configured to:
reduce a frequency of the connectivity scan in response to the motion profile being the stationary motion profile or the driving motion profile, and
increase a frequency of the location scan in response to the motion profile being the driving motion profile and the detection of the Wi-Fi access point identifier.

2. The electronic device of claim 1, wherein the plurality of preset motion profiles comprise a stationary motion profile, a walking motion profile, and a driving motion profile.

3. The electronic device of claim 2, wherein:
the stationary motion profile is determined in response to the speed of the electronic device being less than a first threshold;
the walking motion profile is determined in response to the speed of the electronic device being between the first threshold and a second threshold; and
the driving motion profile is determined in response to the speed of the electronic device being greater than the second threshold.

4. The electronic device of claim 1, wherein:
the motion profile of the electronic device is determined based at least in part on spatial information of the electronic device; and
the spatial information includes at least one of acceleration measurements performed by an accelerometer, orientation measurements performed by a gyroscope, and data from a Global Positioning System.

5. The electronic device of claim 1, wherein the processor is further configured to determine a proximity of the electronic device to the location based at least in part on the detection of the Wi-Fi access point identifier.

6. The electronic device of claim 5, wherein the processor is further configured to provide the reminder to a user of the electronic device based at least in part on the proximity of the electronic device to the location.

7. The electronic device of claim 1, wherein the Wi-Fi access point identifier comprises a basic service set identification (BSSID) of a Wi-Fi access point.

8. The electronic device of claim 1, wherein the processor is further configured to detect the Wi-Fi access point identifier independent from connecting to a Wi-Fi access point.

9. The electronic device of claim 8, wherein the electronic device lacks a credential to connect with the Wi-Fi access point.

10. The electronic device of claim 1, wherein the Wi-Fi access point identifier is mapped to a latitude and a longitude corresponding to the location.

11. A computer-program product for use in conjunction with an electronic device, the computer-program product comprising a non-transitory computer-readable storage medium and a computer-program mechanism embedded therein, to adjust a frequency of network scans, the computer-program mechanism comprising:
instructions for determining a motion profile of the electronic device based at least in part on a speed of the electronic device, wherein the motion profile is determined from a plurality of preset motion profiles comprising a stationary motion profile, a walking motion profile, and a driving motion profile;
instructions for detecting a Wi-Fi access point identifier during a scan, wherein the Wi-Fi access point identifier is mapped to a location associated with a reminder; and
instructions for adjusting the frequency of the network scans performed by an interface circuit in the electronic device based at least in part on the motion profile and the detection of the Wi-Fi access point identifier,
wherein the network scans comprise a connectivity scan and a location scan, and
wherein the instructions for adjusting the frequency of the network scans comprises:
instructions for reducing a frequency of the connectivity scan in response to the motion profile being the stationary motion profile or the driving motion profile, and
instructions for increasing a frequency of the location scan in response to the motion profile being the driving motion profile and the detection of the Wi-Fi access point identifier.

12. The computer-program product of claim 11, wherein:
the stationary motion profile is determined in response to the speed of the electronic device being less than a first threshold;
the walking motion profile is determined in response to the speed of the electronic device being between the first threshold and a second threshold; and
the driving motion profile is determined in response to the speed of the electronic device being greater than the second threshold.

13. A method of performing network scans comprising:
determining a motion profile of an electronic device based at least in part on spatial information about the electronic device and a speed of the electronic device, wherein the motion profile is determined from a plurality of preset motion profiles comprising a stationary motion profile, a walking motion profile, and a driving motion profile;
detecting a Wi-Fi access point identifier during a scan, wherein the Wi-Fi access point identifier is mapped to a location associated with a reminder; and
adjusting a frequency of the network scans based at least in part on the motion profile and the detection of the Wi-Fi access point identifier,
wherein the network scans comprise a connectivity scan and a location scan, and
wherein the adjusting the frequency of the network scans comprises:
reducing a frequency of the connectivity scan in response to the motion profile being the stationary motion profile or the driving motion profile, and
increasing a frequency of the location scan in response to the motion profile being the driving motion profile and the detection of the Wi-Fi access point identifier.

14. The method of claim 13, wherein
the stationary motion profile is determined in response to the speed of the electronic device being less than a first threshold;
the walking motion profile is determined in response to the speed of the electronic device being between the first threshold and a second threshold; and
the driving motion profile is determined in response to the speed of the electronic device being greater than the second threshold.

* * * * *